May 22, 1928.
J. I. MURPHY
PITTING TOOL
Filed July 17, 1926
1,671,043
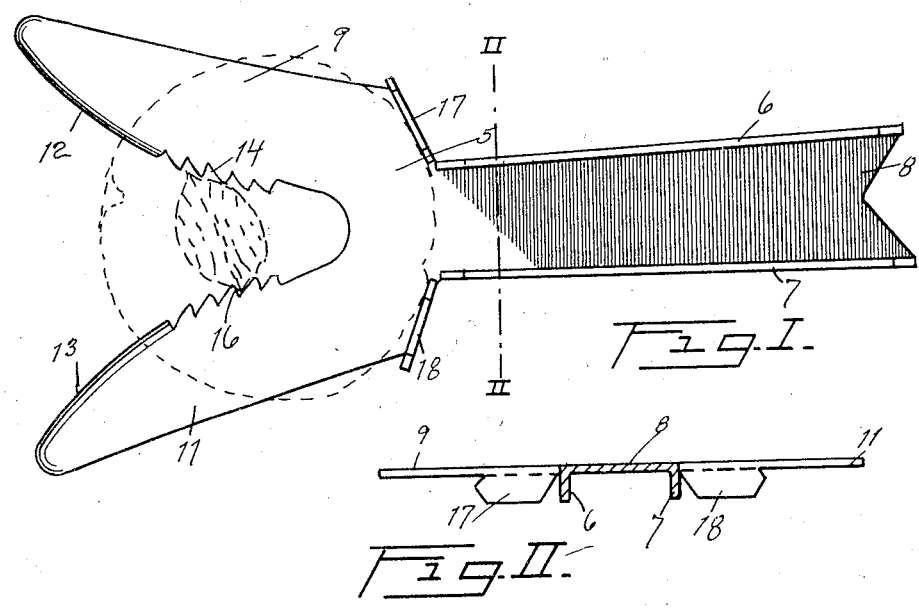
INVENTOR.
JAMES I MURPHY
BY Victor J. Evans
ATTORNEY.

Patented May 22, 1928.

1,671,043

UNITED STATES PATENT OFFICE.

JAMES I. MURPHY, OF MOUNTAIN VIEW, CALIFORNIA.

PITTING TOOL.

Application filed July 17, 1926. Serial No. 123,154.

This invention relates to improvements in pitting tools and has particular reference to a device for removing pits from fruit.

The principal object of this invention is to produce a device which will effectively remove the pit from fruit such as peaches, apricots and the like, without mutilating the fruit by crushing it.

A further object is to produce a device of this character which is simple to use, and will result in a saving of considerable labor.

A further object is to produce a device of this character which is cheap to manufacture and, therefore, well within the purchase price of the average user.

Other objects and advantages will be apparent during the course of the following description.

In the accompanying drawings forming a part of this specification, and in which like numerals are employed to designate like parts throughout the same, Figure 1 is a side elevation of my peach pitting tool as the same would appear in use and Figure 2 is a cross section taken on the line II—II of Figure 1.

In the pitting of fruit it has been customary to employ a knife and by cutting around the fruit so as to halve the same the halves could then be separated so as to remove the pit. This was a tedious operation and one which mutilated the fruit to a considerable extent. Also when pitting clingstone peaches it was a difficult matter to remove the pit from one of the halves owing to the slippery condition of the pit which made it hard to grasp, the result being that in some canneries a curved spoon was used for removing the pits. This caused a considerable waste which from an economical standpoint was detrimental to the business. The applicant has, therefore, produced a simple pitting tool which obviates the disadvantages above referred to.

In the accompanying drawings wherein for the purpose of illustration is shown a preferred embodiment of my invention, the numeral 5 designates a blank having upturned rims 6 and 7 which rims together with the portion of the blank therebetween, forms a handle designated by the numeral 8.

The blank is bifurcated so as to form cutting portions 9 and 11, which cutting portions are sharpened as shown at 12 and 13, respectively, and are further provided with teeth 14 and 16, respectively, the purpose of which teeth is to engage the pit of the fruit as illustrated in dotted lines in Figure 1.

Upturned portions 17 and 18 form finger guards which materially assist in keeping the hands from slipping upon the handle 8.

In the form shown in Figure 3 the construction is identical with the exception that the teeth 14 and 16 are omitted with the result that the sharpened edges converge and meet each other as illustrated in this figure.

The manner of employing my pitting tool is as follows:

Assuming that it is desired to pit a peach, the peach is grasped in one hand, the tool is grasped in the other, after which the sharpened edges 12 and 13 are brought into contact with the peach and pushed thereinto almost to the pit. The tool is then given a quarter turn with respect to the peach which will finish the cutting operation. By now pushing the tool into tighter engagement with the pit the teeth will grip the pit on each side thereof, and with a slight twist the same will be effectively removed from its engagement with the meat of the peach. At this time the two halves of the peach will be separated leaving the pit in the tool. By slightly pushing the pit with the thumb the same may become disengaged from the tool after which the next peach may be pitted in the same manner.

It is to be understood that the form of my invention herein shown and described is to be taken as a preferred example of the same, and that various changes in the shape, size and arrangement of parts may be resorted to without departing from the scope of the subjoined claim.

Having thus described my invention, I claim:—

In a tool of the character described, a blank having a bifurcated portion, a handle connected thereto, the bifurcated portion having sharpened converging edges adapted to engage fruit brought thereagainst and to sever the fruit into halves and teeth formed adjacent said sharpened edges, said teeth projecting toward the handle of said device for engaging the pit of the fruit for the purpose of removing the pit from the halves in the manner specified.

In testimony whereof I affix my signature.

JAMES I. MURPHY.